Sept. 29, 1936.   L. C. KETTENRING ET AL   2,055,627
METHOD OF DEWAXING OILS
Filed June 4, 1934
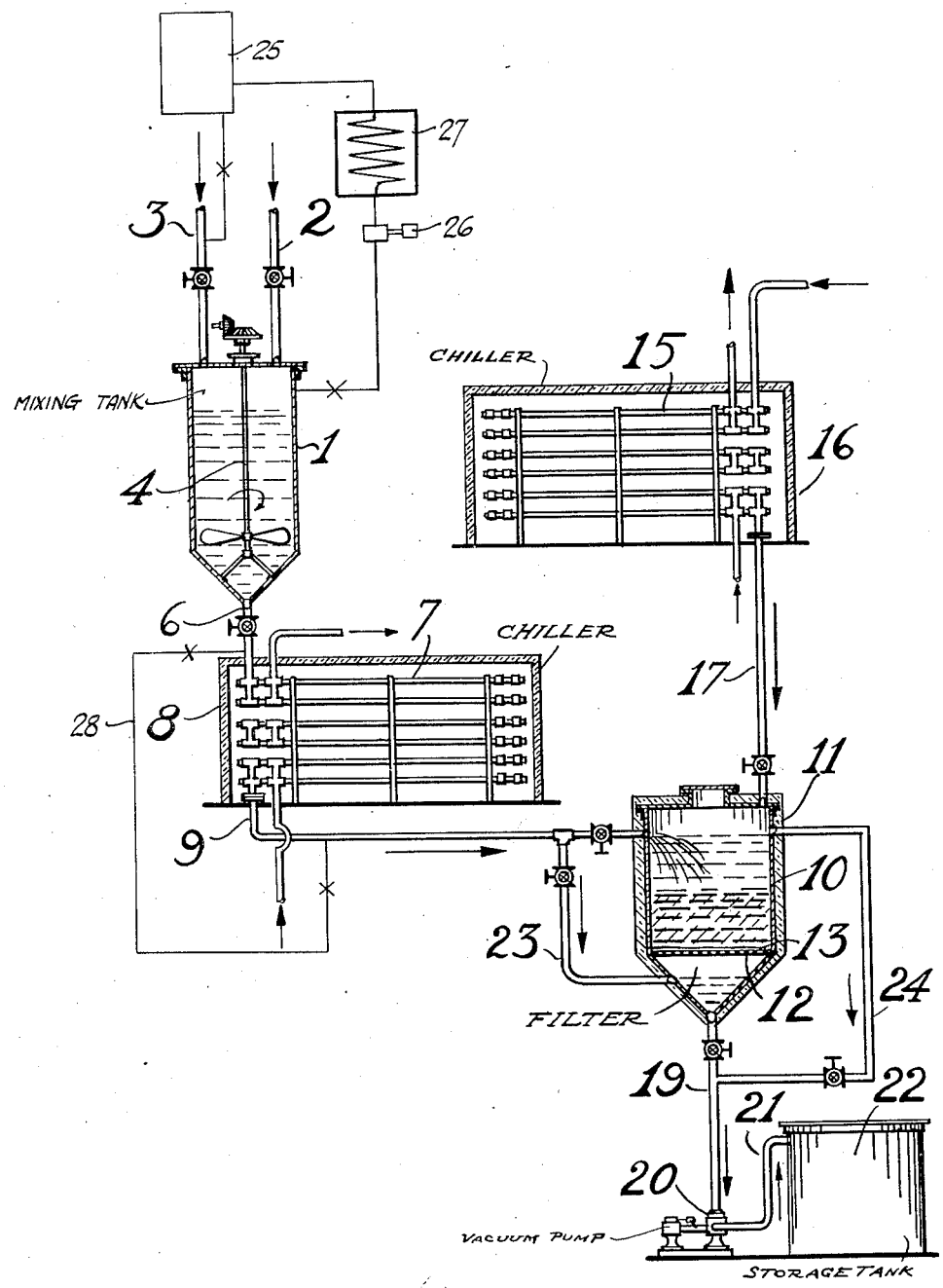
Leon C. Kettenring  Inventors
Louie H. Robertson
By P. L. Young Attorney Patented Sept. 29, 1936

2,055,627

UNITED STATES PATENT OFFICE 2,055,627

METHOD OF DEWAXING OILS

Leon C. Kettenring, Plainfield, and Louie H. Robertson, Elizabeth, N. J., assignors to Standard Oil Development Company, a corporation of Delaware Application June 4, 1934, Serial No. 728,990

11 Claims. (Cl. 196—19)

This invention relates to the dewaxing of oils and is more particularly concerned with improvements in the method of removing wax from petroleum oils.

This application is a continuation in part of Serial No. 467,668, filed by the same applicants on July 14, 1930.

The invention will be fully understood from the following description read with reference to the accompanying drawing which is a diagrammatic view in sectional elevation of a type of apparatus suitable for the purpose.

Referring to the drawing, numeral 1 designates a mixing tank having valved inlet pipes 2 and 3 for the admission of wax-containing oil and a solvent therefor. A stirring apparatus 4 is provided for mixing the contents of the tank.

In mixing tank 1 the oil is mixed with a solvent which may be of such characteristics that the density of the resulting solution will be either greater or less than the density of the wax contained in the oil.

The solution formed in tank 1 is withdrawn therefrom through valved line 6 and passed through a coil 7 disposed within a suitable chilling means 8. It will be understood that the chilling means may be constructed in any suitable manner. The solution is chilled to a temperature below the required pour point of the dewaxed oil. This temperature may range from about 5° F. to 25° F. or more below the pour point which it is desired to obtain in the dewaxed oil.

The chilled solution is withdrawn from chiller 8 through a valved line 9 into a filter tank 10 which is provided with insulation means 11. A perforated supporting plate 12 is disposed within the tank and extends horizontally across the tank adjacent its bottom. A filtering cloth 13 is disposed upon the perforated plate and, in turn, supports a porous filtering medium, such as, fuller's earth, diatomaceous earth, clay, sand, sawdust or any other comminuted solid or porous substance, or any fibrous, mineral, vegetable or animal substance which has wax adhering properties. Woolen or cotton mats or blankets can also be used. The layer of filtering medium is of sufficient thickness to effect separation of the wax from the chilled solution.

Prior to the introduction of the chilled solution into the filtering tank, the temperature of the latter and particularly the temperature of the filtering bed is preferably brought to approximately the temperature of the chilled solution which will be introduced thereinto. One method of accomplishing preliminary cooling of the filter tank is to pass solvent, which may be of the same type as that used in the process or of some other type, through a coil 15 within a chiller 16, wherein it may be chilled to approximately the temperature of the chilled solution which will subsequently be introduced into the filtering tank. The chilled solvent is conducted through valve line 17 into filtering tank 10 where it passes through and chills the filtering medium. When the temperature of the filtering medium has been lowered to approximately the temperature of the chilled solution, the supply of chilled solvent is cut off and the chilled solution is then introduced into the filtering tank. The required low temperature is then maintained in the filtering tank by the chilled solution itself.

When the solvent used is of such characteristics that the resulting solution has a density greater than that of the precipitated wax, the chilled solution will be introduced into the filtering tank 10 at some point above the bed of filtering medium. The chilled solution will then flow downwardly in the filtering tank and will pass through the bed of filtering medium. The wax will be absorbed on the filtering medium and the solution of dewaxed oil may be withdrawn from filtering tank 10 through line 19.

When the solvent used is of such characteristics that the resulting solution has a density lower than that of the wax to be precipitated, the chilled solution will be introduced into filtering tank 10 through line 23 at some point below the bed of filtering medium. In this case the solution will flow upwardly in the filtering tank and will pass through the bed of filtering medium. The filtering medium will absorb the wax and the clear solution of dewaxed oil will pass out of the filter tank 10 through valve line 24.

A vacuum pump 20 is preferably connected to line 19 in order to establish a difference in pressure between the inlet and outlet sides of the filter tank and to facilitate the passage of the solution through the bed of filtering medium. If desired, pressure may be applied mechanically either above or below the bed of filtering medium in order to force the solution therethrough. In some cases gravity alone may be sufficient to effect passage of the solution through the filtering medium. The filtered solution is discharged from the vacuum pump 20 through line 21 and may be collected in a suitable storage tank 22. From tank 22 the filtered solution may be passed to other equipment (not shown) for the removal of the solvent by distillation or other means.

When a liquefied normally gaseous hydrocarbon is used both as the solvent and as an evaporative refrigerant, liquefied hydrocarbon is supplied from storage tank 25 through line 3 to the mixing tank 1. In order to chill the solution in tank 1, pressure may be reduced and the vaporized hydrocarbon allowed to expand into compressor 26 from which it is discharged through cooler 27 and returned to storage tank 25. When the solution in tank 1 is chilled by evaporative refrigeration, the chilled solution is by-passed around the chiller 8 by means of valved line 28.

A particular feature of the present invention is that the separation of the wax from the chilled solution is accomplished by both gravity separation and filtration in a single tank. A further advantage of the present invention is that the chilled solution is caused to flow through the filtering bed in a direction such that the particles of wax cannot cause serious clogging of the bed of filtering medium. Thus, for example, when a solvent having such characteristics that the resulting solution has a density lower than that of the precipitated wax is used, the chilled flux is passed upwardly through the bed of filtering medium so that the wax which tends to settle downwardly by gravity is prevented from settling in a compact mass in the filtering medium by the upwardly rising stream of solution. Conversely, if the solvent used is of such characteristics that the resulting solution has a density greater than that of wax, the wax which tends to separate by flotation is prevented from packing down on to the filter bed by the downwardly flowing stream of chilled flux.

In the operation of the process the oil to be dewaxed may be any hydrocarbon or petroleum oil containing either amorphous or crystalline wax or both. Petroleum oils having a wide range of viscosity, say from 50 to 200 seconds Saybolt at 210° F. may be used. The process is particularly adapted to the dewaxing of petroleum oils which contain amorphous wax or a mixture of amorphous and crystalline wax, such as residual oils or paraffin slop.

Among solvents of such characteristics that the resulting solution will have a density lower than that of the precipitated wax may be mentioned naphtha, petroleum ether, alcohol, acetone, acetone-benzol and liquefied normally gaseous hydrocarbons, such as ethane, propane and butane or mixtures thereof, either with each other or with normally liquid solvents.

Among solvents of such characteristics that the resulting solution will have a density greater than that of the precipitated wax may be mentioned chlorinated hydrocarbons, such as carbon tetrachloride, ethylene dichloride, ethylene trichloride and the like. Mixtures of these chlorinated hydrocarbons with smaller proportions of other solvents, such as naphtha, may also be used.

The quantity of solvent used may be varied widely but, in general, 60 to 70% of solvent and 30 to 40% of oil will be the most satisfactory proportions.

The chilling of the solution may be carried out either by indirect or direct means. If liquefied normally gaseous hydrocarbons, such as ethane, propane and butane, are used either as the solvent or as one component of the solvent, the chilling may be advantageously accomplished by evaporation of a portion of the liquefied hydrocarbons from the solution.

The process has been indicated to be particularly adapted to the dewaxing of oils containing so-called "amorphous waxes". Heretofore it has been usual in dewaxing oils containing amorphous waxes to mix the oil with a filter aid, cool the mixture and pass it through a filter press which retains the amorphous waxes and filter aid and allows the clear solution to pass through. By means of the present process it is possible to remove amorphous waxes from oil by filtration without the use of a filter aid. In accordance with the present method, residual oils containing amorphous waxes or a mixture of amorphous and crystalline waxes are chilled to temperatures sufficiently low to cause the waxes to be precipitated in such form as to permit free passage of oil and solvent around and between the crystals of wax.

As an example of the application of the present process, a cylinder oil having a viscosity of approximately 135 seconds Saybolt at 210° F. and a pour point of approximately 95° F. is dissolved in petroleum ether in proportions of about 68% petroleum ether to 32% cylinder oil. The solution is chilled to a temperature of about 5° F. A bed of fuller's earth of about 6 inch thickness and of about 30 to 60 mesh is then chilled to approximately 5° F. The chilled solution is passed upwardly through the bed of fuller's earth. A relatively large amount of bright stock is recovered from the filtered solution and a petrolatum having a high melting point is obtained from the wax.

In one form of the invention, relatively small percentages, such as 1% of crystalline wax, for example, a paraffin wax having a melting point of 118 to 120° F is added to a residual petroleum oil containing amorphous wax and then the mixture is dissolved in a suitable solvent as described above. By this procedure the crystallization of the waxes present in the petroleum oil is aided materially and more rapid separation of the waxes from the chilled solution is, therefore, possible during the subsequent filtration.

It will be understood that various changes may be made within the scope of the appended claims in which it is desired to claim all novelty inherent in the invention as broadly as the prior art permits.

We claim:

1. In the dewaxing of petroleum oil the steps which comprise diluting the oil with a solvent which dissolves all fractions of the oil, chilling the solution to a temperature at which wax is caused to precipitate, introducing the chilled mixture into a chamber provided with means for gravity separation of wax and a filtering means comprising a filter bed, separating a portion of the wax by gravity difference and the remaining portion by filtration through the filter bed, recovering wax-free oil and removing the diluent therefrom.

2. The method of removing wax from wax containing oils, which comprises diluting the oil with a solvent which dissolves all fractions of the oil of such characteristics that the resulting solution will have a specific gravity different from that of the wax, chilling the solution to a temperature at which wax is caused to precipitate, introducing the chilled mixture into a chamber provided with a gravity separation means and a filtering means comprising a filter bed at such a point that a substantial portion of the wax may separate from the solution by difference of gravity prior to passage of the solution through the filtering means, and then causing the chilled solution to pass through the filtering means whereby the remainder of the wax is separated from the solution, and recovering dewaxed oil from the filtered solution.

3. The method of removing wax from petroleum oil which comprises diluting the oil with a solvent which dissolves all fractions of the oil of such characteristics that the resulting solution will have a specific gravity greater than that of the wax, chilling the solution to a wax separation temperature, introducing the chilled mixture into a chamber provided with a gravity separation means and a filtering means comprising a filter bed at such a point that a substantial portion of the wax may separate by flotation, causing the chilled solution to flow downwardly through the filtering means, whereby the remainder of the wax is removed, and recovering dewaxed oil from the filtered solution.

4. The method of removing wax from petroleum oil which comprises diluting the oil with a solvent which dissolves all fractions of the oil of such characteristics that the resulting solution will have a specific gravity lower than that of the wax, chilling the solution to a wax separation temperature, introducing the chilled mixture into a chamber provided with a settling means and a filtering means comprising a filter bed at such a point that a substantial portion of the wax may separate by gravity difference prior to passage of the solution through the filtering means, causing the chilled solution to flow upwardly through the filtering means whereby the remainder of the wax is removed by filtration, and recovering dewaxed oil from the filtered solution.

5. Process according to claim 3 in which the solvent comprises a chlorinated hydrocarbon.

6. Process according to claim 4 in which the solvent comprises a liquefied normally gaseous hydrocarbon and the chilling is effected by the evaporation of a portion of the liquefied hydrocarbon from the solution.

7. The method of separating amorphous wax from petroleum residual oil which comprises dissolving the oil and wax in a solvent which dissolves oil fractions of the oil of such properties that the resulting solution will have a specific gravity different from that of the wax, chilling the resulting solution of the oil and wax to a point at which the wax is caused to separate, passing the chilled solution and the separated wax into juxtaposition to a bed of filtering medium disposed in a chamber with means for gravity separation above and below the bed, the point of supply of the solution being above the filter bed when the solvent is heavier than the wax and below the filter bed when the solvent is lighter than the wax, separating the wax from the major part of the solution by difference in specific gravity and passing the remaining solution through the filter bed.

8. Method of separating amorphous wax from petroleum residual oil, which comprises dissolving the oil and wax in a solvent for the same of such properties that the resulting solution will have a different specific gravity than the wax, chilling the resulting solution of the oil and wax to a point at which the wax separates, passing the chilled solution and the separated wax into juxtaposition to a filter bed disposed in a chamber with means for gravity separation above and below the bed, the point of supply of the solution being above the filter bed when the solvent is heavier than the wax and below the filter bed when the solvent is lighter than the wax, separating the wax from the major part of the solution by difference in specific gravity, and passing the remaining solution through the filter bed.

9. Method according to claim 8 in which the solution of oil and solvent is chilled to a temperature of at least 30° F.

10. Method of removing amorphous waxes from petroleum residual oil, which comprises diluting the oil with a solvent of lower specific gravity than the wax which dissolves all fractions of the oil, chilling the solution to a temperature below the required cold test of the dewaxed oil, and passing the chilled solution upwardly through a bed of filtering medium.

11. Method of removing amorphous waxes from petroleum residual oil, which comprises diluting the oil with a solvent of specific gravity greater than that of the wax which dissolves all fractions of the oil, chilling the solution to a temperature below the required cold test of the oil, and passing the entire chilled solution downwardly through a bed of filtering medium.

LEON C. KETTENRING.
LOUIE H. ROBERTSON.